(Model.)
P. SEITZ.
Cultivator.
No. 241,074. Patented May 3, 1881.
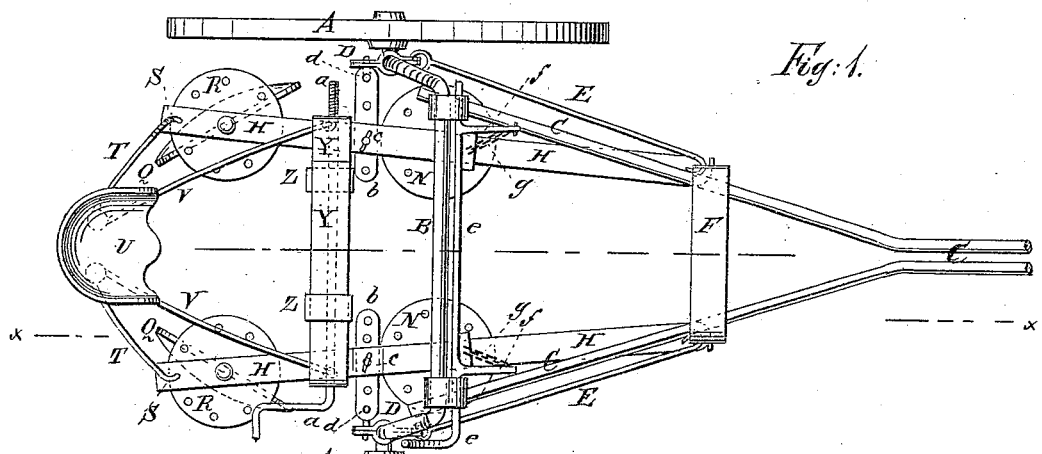
WITNESSES:
INVENTOR:
P. Seitz
BY Munn & Co
ATTORNEYS.

UNITED STATES PATENT OFFICE.

PHILIP SEITZ, OF BATON ROUGE, ASSIGNOR OF ONE-HALF TO RICHARD W. BOLAND, OF NEW ORLEANS, LOUISIANA.

CULTIVATOR.

SPECIFICATION forming part of Letters Patent No. 241,074, dated May 3, 1881.

Application filed August 6, 1880. (Model.)

*To all whom it may concern:*

Be it known that I, PHILIP SEITZ, of Baton Rouge, in the parish of East Baton Rouge and State of Louisiana, have invented a new and useful Improvement in Cultivators, of which the following is a specification.

Figure 1 is a plan view of the improvement. Fig. 2 is a sectional side elevation taken through the line $xx$, Fig. 1. Fig. 3 is a sectional front elevation taken through the line $yy$, Fig. 2.

Similar letters of reference indicate corresponding parts.

The object of this invention is to furnish cultivators so constructed that they can be adjusted to bar off and to dirt the plants and to work at any desired depth in the ground, as circumstances may require.

A represents the wheels, which revolve upon the journals of the axle B. The middle part of the axle B is bent into arched form, so as to pass over tall plants without injuring them.

To the arch of the axle B, at the upper ends of its arms, is attached the forked rear end of the tongue C, so that the tongue will be raised above the plants.

To the lower ends of the arms of the arch of the axle B are attached clamps D, to receive the rear ends of the draw-rods E, the forward ends of which are attached to the arms of the U-bar F. The bend of the U-bar F passes over and is secured to the tongue C.

To the lower end of each arm of the U-bar F is attached a link or other flexible connection, G, to which are attached the forward ends of two plow-beams, H I, placed the one directly below the other.

To the connections G may also be applied the draft, or the draft may be applied to hooks attached to the arms of the U-bar F.

To the rear ends of the lower beams, I, are swiveled, by a bolt or other suitable means, the bends of the U-shaped standards J, to the ends of the arms of which are attached the bolts K, which pass through the centers of two, three, or more disks, colters, or circular plow-plates, L. The colters L are kept at the proper distance apart by tubular washers M, placed between them upon the said bolts K.

To the bends of the U-shaped standards J are rigidly attached circular plates or turn-tables N, which have a number of holes formed through them to receive the pins O, passed down through holes in the beams I, so that the colters L may be adjusted in line with the draft or set at an inclination in either direction. The upper beams, H, are made longer than the lower beams, I, and to the rear ends of the said beams H are swiveled, by a bolt, rivet, or other suitable means, the bends of the U-shaped standards P, to and between the ends of the arms of which are pivoted the circular plow-plates or disks Q. The circular plow-plates or disks Q are made concave upon their inner sides and convex upon their outer sides, as shown in Fig. 1, and are set with their forward edges inclined outward, so that they will throw soil toward and around the plants.

To the bends of the U-shaped standards P are rigidly attached circular disks or turn-tables R, which have a number of holes formed through them to receive the pins S. The pins S also pass through holes in the rear parts of the beams H, so that the plow-plates Q can be readily adjusted at a greater or less inclination to cause them to throw more or less soil around the plants, and can be reversed to cause them to throw the soil from or bar off the plants. The pins S may be separate, or they may be formed upon the lower ends of the standards T, to the upper ends of which is attached the driver's seat U. The driver's seat U is further secured in place by the braces V, the rear ends of which are attached to the said seat U. The forward ends of the braces V have hooks formed upon them, and are hooked into sockets W, formed upon or attached to the inner sides of the upper parts of the uprights X, the lower ends of which are attached to the beams H.

In sockets or keepers attached to the upper parts of the uprights X are inserted the lower vertical arms of the angular bars Y, the upper arms of which are horizontal, overlap each other, and pass through keepers Z, attached to each other.

$a$ is a crank-screw, which is swiveled to the upright arm of one of the angle-bars Y and passes through a screw-hole in the upright arm of the other angle-bar Y, so that the uprights X and plow-beams H can be adjusted wider apart or closer together by turning the said crank-screw $a$, and will be held securely in place when adjusted by the said crank-screw. The plow-beams H are further secured in place by the bars $b$, which pass through holes in the said beams H, and have numerous holes formed through their inner parts to receive the pins $c$, by which they are secured adjustably to the said beams H. In the outer ends of the bars $b$ are formed holes to receive the upright rods $d$, the lower ends of which are bent upward and outward, and are attached to the clamps D, so as to hold the beams H against lateral movement, while allowing them to move up and down freely.

$e$ is a crank-shaft, which works in bearings attached to the bend of the axle B, and to which are rigidly attached, or upon it are formed, two rigid arms, $f$.

To the outer ends of the arms $f$ are attached the upper ends of the chains $g$, to the lower ends of which are attached loops or stirrups $h$. The stirrups $h$ are attached to the lower beams, I, and the upper beams, H, pass through them, so that the beams H will be kept in place directly above the beams I, and so that both pairs of beams will be raised together by operating the crank-shaft $e$.

With this construction the two sets of revolving plow plates or colters L cut in pieces the weeds, clods, and lumps upon both sides of a row of plants and loosen the soil, and the revolving plow-plates or disks Q, following them, throw the soil toward or from the plants, as may be required.

Having thus fully described my invention, I claim as new and desire to secure by Letters Patent—

1. In a cultivator, the combination, with the carriage A B C, the U-shaped bar F, and the draw-rods E, of the short beams I, the swiveled U-shaped standards J, having locking turn-tables or disks N, the sets of rotating circular cutters or plow-plates L, the long beams H, the swiveled U-shaped standards P, having locking turn-tables or disks R, and concavo-convex rotating disks or plow-plates Q, as and for the purpose specified.

2. The combination, with the disks, of the shaft K, the swiveled U-bar J, the turn-table N, having a number of holes for pins, and the beam I, as and for the purpose set forth.

PHILIP SEITZ.

Witnesses:
JOSEPH GEBELIN,
F. M. BROOKS.